United States Patent
Rice et al.

(10) Patent No.: US 11,157,364 B1
(45) Date of Patent: Oct. 26, 2021

(54) DISTRIBUTED ERROR CORRECTION CODING FOR PARALLEL STORAGE DEVICES

(71) Applicant: Seagate Technology LLC, Fremont, CA (US)

(72) Inventors: David Andrew Rice, Longmont, CO (US); Ajay Narayan Kulkarni, Longmont, CO (US); Brian T. Edgar, Minneapolis, MN (US)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 0 days.

(21) Appl. No.: 16/915,560

(22) Filed: Jun. 29, 2020

(51) Int. Cl.
*G06F 11/10* (2006.01)
*G11B 20/18* (2006.01)
*G11B 5/48* (2006.01)
*G11B 20/12* (2006.01)

(52) U.S. Cl.
CPC ........ *G06F 11/1076* (2013.01); *G11B 5/4813* (2013.01); *G11B 20/1258* (2013.01); *G11B 20/1833* (2013.01); *G11B 20/1876* (2013.01)

(58) Field of Classification Search
None
See application file for complete search history.

(56) References Cited

U.S. PATENT DOCUMENTS

| | | | | |
|---|---|---|---|---|
| 6,307,705 B1 * | 10/2001 | Anderson | ............ | G11B 5/5547 360/78.04 |
| 6,735,032 B2 * | 5/2004 | Dunn | ................. | G11B 5/59633 360/31 |
| 7,102,842 B1 * | 9/2006 | Howard | ............... | G11B 5/5521 360/61 |
| 7,299,399 B2 | 11/2007 | Huang | | |
| 8,885,277 B1 * | 11/2014 | Erden | .................. | G11B 5/4886 360/39 |
| 9,280,421 B2 | 3/2016 | Nazarian et al. | | |
| 9,830,939 B1 * | 11/2017 | Hamilton | ................ | G06F 3/064 |
| 9,837,115 B1 * | 12/2017 | Sridhara | ............ | G11B 20/1833 |
| 9,996,419 B1 | 6/2018 | Bruce et al. | | |
| 10,049,691 B1 * | 8/2018 | Gaertner | .............. | G11B 5/4813 |
| 10,090,010 B1 * | 10/2018 | Erden | ....................... | G11B 5/58 |
| 10,276,208 B1 * | 4/2019 | Bai | ...................... | G11B 20/1403 |
| 10,424,328 B1 * | 9/2019 | Gaertner | .............. | G11B 5/4886 |
| 10,706,886 B1 * | 7/2020 | Parkash | .................. | G11B 5/012 |
| 10,720,177 B1 * | 7/2020 | Ng | ....................... | G11B 20/1833 |
| 10,839,840 B2 * | 11/2020 | Takada | .................. | G06F 3/0676 |
| 2008/0123213 A1 * | 5/2008 | Craig | ...................... | G11B 5/012 360/75 |

(Continued)

*Primary Examiner* — Tan X Dinh (74) *Attorney, Agent, or Firm* — Holzer Patel Drennan (57) ABSTRACT

ECC is used to for controlling errors in blocks of data by including a measure of redundancy within the data for recovering one or more unreadable portions of the data. A codeword includes at least a message and one or more additional ECC blocks. In the event of an unreadable sector, the ECC is decoded and used to recover the erroneous or missing portion(s) of the message. With disc access parallelism, ECCs can now be distributed across data storage surfaces and/or multiple storage platters. Distribution of ECCs increases the likelihood of recovering data from a head failure or from burst errors on a data storage surface and adds the option to decode parity after only 1/n revolutions.

19 Claims, 7 Drawing Sheets

(56) References Cited

U.S. PATENT DOCUMENTS

| | | | |
|---|---|---|---|
| 2014/0237314 A1* | 8/2014 | Yang | H03M 13/114 714/752 |
| 2015/0256199 A1* | 9/2015 | Yen | H04L 1/0052 714/752 |
| 2019/0356334 A1* | 11/2019 | Oboukhov | G06F 3/0676 |

* cited by examiner

DISTRIBUTED ERROR CORRECTION CODING FOR PARALLEL STORAGE DEVICES

BACKGROUND

Storage capacities of hard disc drives (HDDs) have generally increased over time due in part to increases in areal density. Increases in HDD capacity driven by increased areal density, while reducing cost, can reduce effective input/output (I/O) performance (i.e., I/O access speed per unit capacity) if the read/write assembly remains substantially the same. For example, a relatively large write operation (e.g., a rebuild of a failed volume of a disc drive array) can take an unacceptable quantity of time at the areal densities now found in HDDs.

One way to increase I/O performance is to utilize multiple actuator arms, each with associated read/write heads (or a singular actuator arm with multiple associated read/write heads) simultaneously and independently running in parallel within a singular HDD (referred to as a parallel HDD and disc access parallelism). Such parallelism can increase the rate of input/output operations (IOPS) and thereby improve I/O performance. Multiple read/write heads operating simultaneously and independently also creates opportunities for other processes that may have been impossible or impractical using a traditional read/write assembly, such as in error correction coding (ECC).

ECC is used for controlling errors in blocks of data by including a measure of redundancy within the data for recovering one or more unreadable portions of the data. Traditionally, the ECC is implemented as a track-based outer code in an HDD. A codeword includes at least a message and one or more additional error correction blocks. In the event of an unreadable sector, the ECC is decoded and used to recover the erroneous or missing portion(s) of the message. However, to utilize a track based ECC, an entire track must be read to recover data and the loss of a head renders data readable by that head unrecoverable.

SUMMARY

Implementations described and claimed herein address the foregoing problems by providing a hard disc drive comprising a first storage media surface including a first array of tracks and an associated first transducer head, and a second storage media surface including a second array of tracks and an associated second transducer head. A first codeword is distributed across one or more tracks of the first array of data tracks and one or more tracks of the second array of data tracks.

Implementations described and claimed herein address the foregoing problems by further providing a method comprising writing a first portion of a codeword to a first one or more tracks of a first array of tracks on a first storage media surface using a first transducer head. The method further comprises writing a second portion of the codeword to a second one or more tracks of a second array of tracks on a second storage media surface using a second transducer head.

Implementations described and claimed herein address the foregoing problems by still further providing a data storage device comprising a first storage media storing a first part of a codeword and a second storage media logically disparate from the first storage media storing a second part of the codeword. The codeword includes a first part of a message, a second part of the message, and an error correction code (or outer code). The error correction code portion of the codeword stored in a selected one of the first storage media and the second storage media has a greater write durability than the other of the first storage media and the second storage media.

Other implementations are also described and recited herein.

DETAILED DESCRIPTION

Parallel HDDs including multiple heads driven by separate actuator spindles can read from or write to one or more platters simultaneously and independently (also referred to as disc access parallelism or parallel data paths). Simultaneous active heads can be used to increase data rate or for other purposes (e.g., to increase reliability, service different read/write requests in parallel, etc.). The multiple independently actuated heads can access the same platter or different platters and may be moved across an associated platter surface in a number of different ways. In one implementation, a two (or more) part actuator may independently rotate two arms about a common actuator spindle axis (see e.g., FIG. 1 and the description thereof below). In another implementation, two (or more) actuator spindles are located at different positions around the platter, independently rotating about different actuator spindle axes (see e.g., FIG. 2 and the description thereof below).

Parallel HDD designs can be flexibly configured, providing many options for optimizing different HDD design parameters (including but not limited to writing using one actuator arm while seeking, loading, or unloading with another actuator arm or writing simultaneously using multiple heads mounted to a singular actuator arm). Further, with disc access parallelism, error correction codes (ECCs) can now be distributed across data storage surfaces and/or multiple storage platters. Distribution of ECCs increases the likelihood of recovering data from a head failure or from burst errors on a data storage surface and, when preserving codeword size of one track, adds the option to decode parity after only 1/n revolutions (where n is the number of codeword parts per track). The following implementations describe distributed error correction schemes specifically implemented for HDDs. However, similar distributed error correction schemes may be implemented over other data storage devices (e.g., solid state drives (SSDs)).

Figure 1:
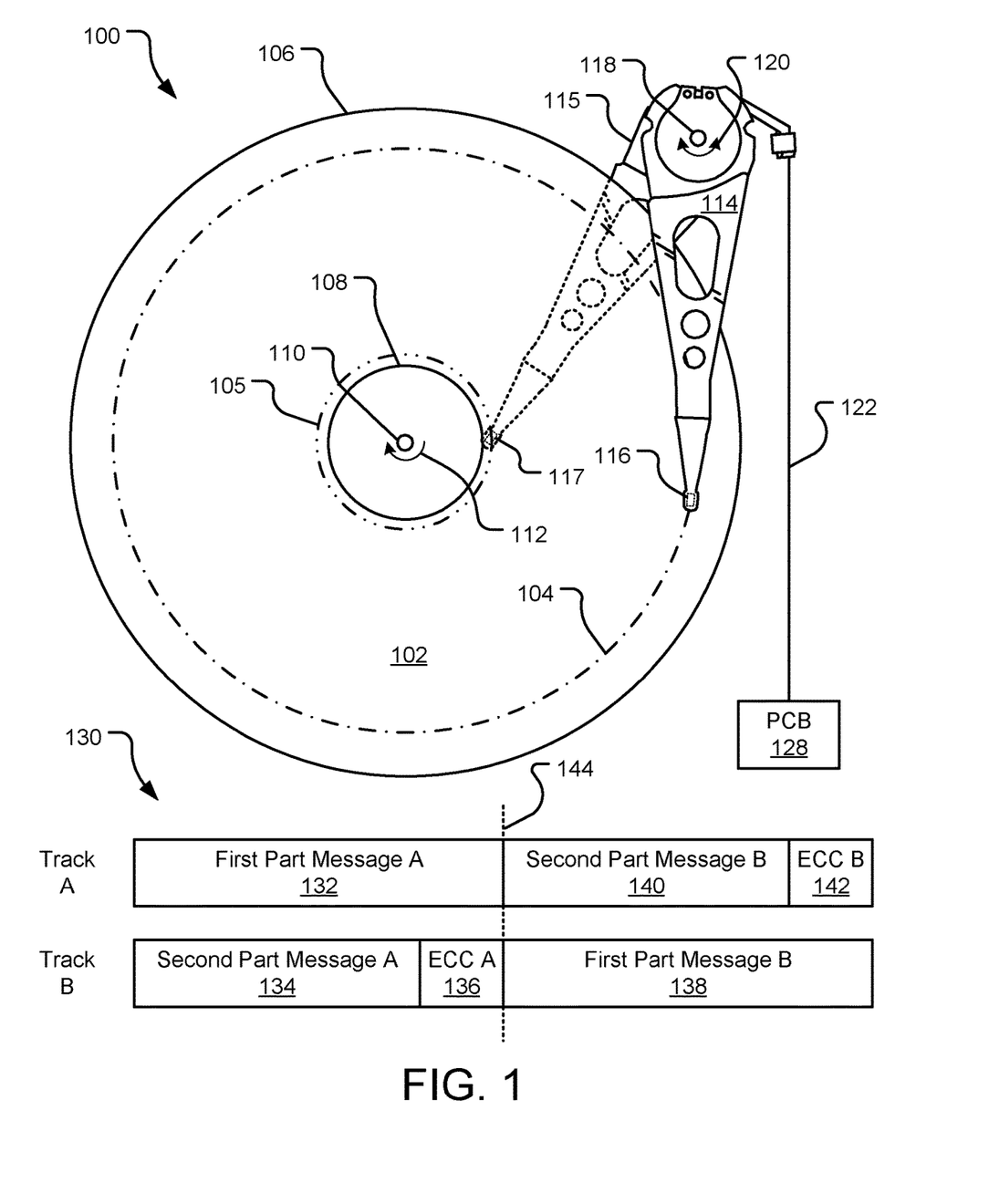
FIG. 1 illustrates an example hard disc drive assembly including a storage platter with two actuator arms mounted on a common actuator spindle but operated independently to achieve a distributed error correction scheme.

FIG. 1 illustrates an example hard disc drive (HDD) 100 assembly including a storage platter (or disc) 102 with two actuator arms 114, 115 mounted on a common actuator spindle 118 but operated independently to achieve a distributed error correction scheme 130. In other implementations, a traditional HDD or other data storage device that does not operate in a parallel manner may incorporate the distributed error correction schemes described herein. The storage platter 102 includes an outer diameter 106 and an inner diameter 108 between which are a number of substantially circular concentric data tracks making up an entirety of the readable and/or writable surface area of the storage platter 102. Specific locations on the storage platter 102 may be defined by any available addressing scheme (e.g., cylinder-head-sector (CHS) addressing and logical block addressing (LBA) schemes). The storage platter 102 rotates at high speed about platter spindle 110 (as illustrated by arrow 112) as information is written to and/or read from data tracks (e.g., tracks 104, 105) on the storage platter 102.

Information may be written to and read from the storage platter 102 via the actuator arms 114, 115 and their respective sliders 116, 117. More specifically, the actuator arm 114 pivots about actuator spindle 118 using a first servo motor (or voice-coil motor (VCM), not shown) during a seek operation to locate the data track 104 on the storage platter 102, as illustrated by arrow 120. The actuator arm 114 extends toward the storage platter 102 and the slider 116 is located at an end of the actuator arm 114 distal from the actuator spindle 118. The slider 116 flies in close proximity above the storage platter 102 while reading data from and/or writing data to the depicted top surface of the storage platter 102.

Similarly, the actuator arm 115 independently pivots about the actuator spindle 118 using a second servo motor (not shown) during a seek operation to locate the data track 105 on the storage platter 102. The actuator arm 115 extends toward the storage platter 102 and the slider 117 is located at an end of the actuator arm 115 distal from the actuator spindle 118. The slider 117 flies in close proximity below the storage platter 102 while reading data from and/or writing data to a bottom surface of the storage platter 102. In some implementations, instead of utilizing completely separate servo motors for each of the actuator arms 114, 115, the HDD 100 may incorporate a 2-part actuator, each part of which assigned to one of the actuator arms 114, 115.

In other implementations, there may be two or more storage platters stacked and rotating together about the platter spindle 110. In such implementations, each of the actuator arms 114, 115 and their respective sliders 116, 117 are assigned to one of the storage platters. For example, the actuator arm 114 and its respective slider 116 may read data from and/or write data to the storage platter 102, while the actuator arm 115 and its respective slider 117 may read data from and/or write data to another storage platter (not shown) stacked above or below the storage platter 102. In still further implementations, the HDD 100 includes a stacked array of any number of storage platters, each of which has an arm and a respective slider as described herein assigned to one or both surfaces or sides (i.e., top and bottom surfaces) of the storage platters. In still further implementations, the HDD 100 may include only one of actuator arms 114, 115 with both of sliders 116, 117 mounted thereon. Or further, only one of sliders 116, 117 including microelectronic components of both of the sliders 116, 117 mounted to one of the actuator arms 114, 115.

The storage platter 102 includes an array of embedded independent magnetic domains and the sliders 116, 117 each include an array of microelectronic components (e.g., a read element, a write element, thermal actuators, other head-media spacing micro-actuators, etc., not shown). The read elements are magneto-resistive, which allows them to read data from the magnetic domains as they pass underneath the read element. The write elements generate magnetic fields that selectively change polarity of the magnetic domains of the storage platter 102 as they pass underneath the write elements, which allows the write elements to write data to the storage platter 102.

A flex cable 122 provides electrical connection paths from a printed circuit board (PCB) 128 to the various microelectronic components attached to the actuator arms 114, 115 and the sliders 116, 117. The flex cable 122 transmits data signals from the read elements and/or to the write elements, while allowing pivotal movement of the actuator arms 114, 115 during operation. In various implementations, there may be multiple flex cables, one for each of the actuator arms 114, 115. Further, the flex cable 122 may be shared from the PCB 128 and then split as it reaches the actuator arms 114, 115 and routed along the actuator arms 114, 115 to the sliders 116, 117.

Storage devices, including the depicted HDD assembly 100, as well as solid state drives (SSDs), tape drives, optical drives, floppy drives, printed barcodes, and so on, use ECCs to encode redundant data for recovery in the case of corruption of some part of the data. The level of redundancy within the data is a tradeoff between code size, data reliability, and data access performance. Various ECCs include Reed-Solomon and low-density parity check (LDPC), as examples of block codes, and Turbo as an example of a convolutional code.

The error correction scheme 130 is distributed across two tracks on the disc 102 (Tracks A & B). Depending upon the implementation, Tracks A & B may coincide with tracks 104, 105, or be different tracks on the disc 102 so long as one of Tracks A & B is accessible by the microelectronic components (or transducer head) on slider 116, while the other of Tracks A & B is accessible by the microelectronic components (or transducer head) on slider 117. A first part of Message A 132 is stored on the first half of Track A. A second part of message A 134, as well as an ECC 136 for Message A, is stored on the first half of Track B. Similarly, a first part of Message B 138 is stored on the second half of Track B. A second part of message B 140, as well as an ECC 142 for Message B, is stored on the second half of Track A. Dotted line 144 illustrates the half-way point of Tracks A & B.

As a result, the entire codeword for Message A or Message B can be read in half a rotation of the disc 102 so long as sliders 116, 117 as positioned to simultaneously read from Tracks A & B. Further, if one of the sliders 116, 117 has a technical problem and data from either of Tracks A & B is no longer readable, the other of the sliders 116, 117 can be used to recover a portion of the data that was distributed across Tracks A & B using the readable ECC (ECC A 136 or ECC B 142), as long as the amount of data lost doesn't exceed the correction capability of the ECC.

While dotted line 144 illustrates half of Tracks A & B in the implementation of FIG. 1, in other implementations, the dotted line 144 may positioned elsewhere within the Tracks A & B so that the first and second parts Messages A & B are disproportionate in size. Further, the Messages A & B may be distributed across more than the depicted two tracks (Tracks A & B), which further enhances the ability to recover data if one of the sliders 116, 117 has a technical problem rendering data on a track readable by the slider no longer readable. For example, to achieve 8:1 (8/9 code rate) parity, the codeword for Message A may be split across eight heads with a ninth head containing the parity bits (or ECC). Should the length of the ECC equal or exceed that of each of the parts of Message A, the ECC may be used to recover data accessible by any of Heads 0-8 should a single head failure occur.

In various implementations, the amount of parity needed to recover from a head loss is the maximum length of any message track. An intermediate amount of parity is defined as that where the redundancy is enough to cover the loss of a transducer/track plus a margin for error (so that some redundancy left after the transducer/track loss). Further, depending on what parts of the Messages A & B are needed, a recovery operation may start by reading the parts of the message that are missing, and only bringing both of sliders 116, 117 to bear on Messages A & B (and redundancy) if needed to recover data.

Further, by distributing the data across more than the depicted two tracks (Tracks A & B), the entire codeword for Message A or Message B can be read in less than half a rotation of the disc 102 so long as corresponding sliders are positioned to simultaneously read from the tracks. More specifically, the entire track-sized codeword may be read in 1/n revolutions (where n is the number of codeword parts per track), assuming the same number of data paths are simultaneously activatable (e.g., 0.25 tracks in the case of the codeword distributed across 4 tracks, 0.125 in the case of the codeword distributed across 8 tracks, as so on). In other implementations, the Messages A & B are not designed to be read simultaneously (an asynchronous read). In such implementations, the error correction scheme 130 will work as described above except that the time to read the entire message is greater than it otherwise would be, due to actuator seek and disc rotational overhead between accessing two different parts of the message.

The distributed ECCs disclosed herein may utilize either block or convolutional codes, as well as any specific parity schemes thereof. Further, while storage devices such as the HDD 100 typically use systematic codes where the original message is embedded in the codeword (e.g., a codeword of size n, composed of k blocks of message followed by k-n blocks of parity), the distributed ECCs disclosed herein are applicable to non-systematic codes. In some implementations, a media cache may be used to store the parity blocks. The media cache could be intentionally placed in a relatively robust area of media (e.g., a lower TPI/BPI, on a NAMR head, in SLC flash, etc.).

Appearances of the actuator arms 114, 115 and other features of the HDD 100 are for illustration purposes only and the features are not drawn to scale. The various microelectronic components attached to each of the sliders 116, 117 may be referred to in total as a transducer head. The presently disclosed technology may apply to rotating disc storage drive technologies other than the magnetic domain HDD 100 depicted in FIG. 1 (e.g., optical disc drives), as well as non-rotating storage technologies (e.g., solid-state drives (SSDs)). Additional details regarding the error correction scheme 130 and other features of the HDD 100 may be found elsewhere herein.

Figure 2:
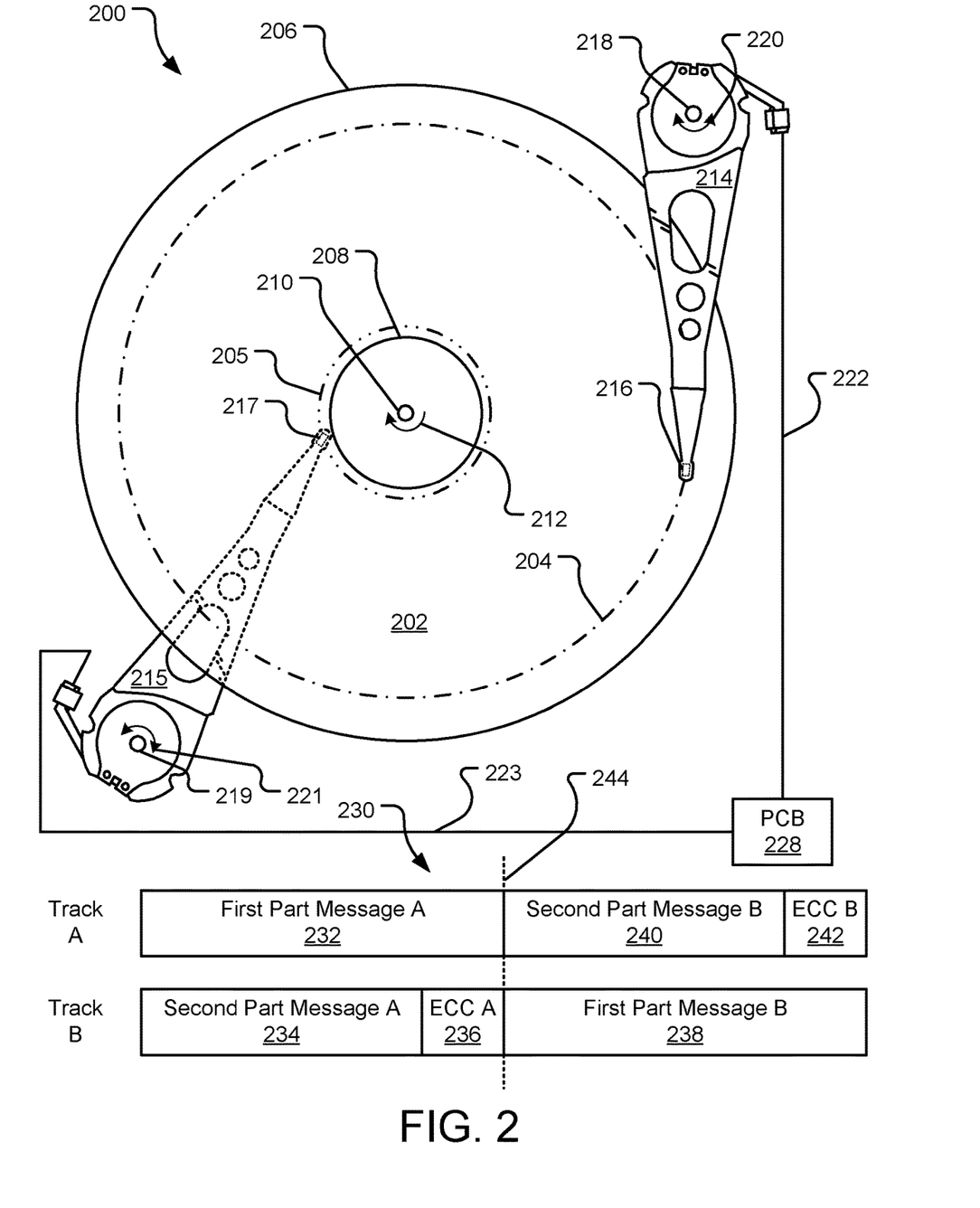
FIG. 2 illustrates an example hard disc drive assembly including a storage platter with two actuator arms mounted on different actuator spindles and operated independently to achieve a distributed error correction scheme.

FIG. 2 illustrates an example hard disc drive assembly 200 including a storage platter (or disc 202) with two actuator arms 214, 215 mounted on different actuator spindles 218, 219 and operated independently to achieve a distributed outer coding scheme. The storage platter 202 includes an outer diameter 206 and an inner diameter 208 between which are a number of substantially circular concentric data tracks making up an entirety of the readable and/or writable surface area of the storage platter 202. The storage platter 202 rotates at high speed about platter spindle 210 (as illustrated by arrow 212) as information is written to and/or read from data tracks (e.g., data tracks 204, 205) on the storage platter 202.

Information may be written to and read from the storage platter 202 via the actuator arms 214, 215 and their respective sliders 216, 217. More specifically, the actuator arm 214 pivots about actuator spindle 218 using a first servo motor during a seek operation to locate the data track 204 on the storage platter 202, as illustrated by arrow 220. The actuator arm 214 extends toward the storage platter 202 and the slider 216 is located at an end of the actuator arm 214 distal from the actuator spindle 218. The slider 216 flies in close proximity above the storage platter 202 while reading data from and/or writing data to the depicted top surface of the storage platter 202.

The actuator arm 215 independently pivots about a different actuator spindle 219 using a second servo motor during another seek operation to locate the data track 205 on the storage platter 202, as illustrated by arrow 221. The actuator arm 215 extends toward the storage platter 202 and the slider 217 is located at an end of the actuator arm 215 distal from the actuator spindle 218. The slider 217 flies in close proximity below the storage platter 202 while reading data from and/or writing data to a bottom non-depicted surface of the storage platter 202.

In various implementations, the actuator arms 214, 215 of the HDD 200 may write to opposite surfaces of the storage platter 202 (as depicted) or potentially the same depicted top surface of the storage platter 202. In still further, implementations, the actuator arms 214, 215 of HDD 200 may write to different platters as discussed above with reference to FIG. 1.

Flex cables 222, 223 provide electrical connection paths from a printed circuit board (PCB) 228 to various microelectronic components attached to the actuator arms 214, 215 and the sliders 216, 217, respectively. The flex cables 222, 223 transmits data signals from read elements and/or to write elements, while allowing pivotal movement of the actuator arms 214, 215 during operation. In some implementations, a common flex cable may extend from the PCB and then split into the flex cables 222, 223 prior to reaching the actuator arms 214, 215, respectively. The flex cables 222, 223 are then routed along the actuator arms 214, 215 to the sliders 216, 217, respectively.

Storage devices, including the depicted HDD assembly 200, as well as solid state drives (SSDs), tape drives, optical drives, floppy drives, printed barcodes, and so on, use ECCs to encode redundant data for recovery in the case of corruption of some part of the data. The level of redundancy within the data is a tradeoff between code size, data reliability, and data access performance. Various ECCs include Reed-Solomon and low-density parity check (LDPC), as examples of block codes, and Turbo as an example of a convolutional code.

The error correction scheme 230 is distributed across two tracks on the disc 202 (Track A and Track B). Depending upon the implementation, the Track A and Track B may coincide with tracks 204, 205, or be different tracks on the disc 202 so long as one of Tracks A & B is accessible by the microelectronic components on slider 216, while the other of Tracks A & B is accessible by the microelectronic components on slider 217. A first part of Message A 232 is stored on the first half of Track A. A second part of message A 234, as well as an ECC 236 for Message A, is stored on the first half of Track B. Similarly, a first part of Message B 238 is stored on the second half of Track B. A second part of message B 240, as well as an ECC 242 for Message B, is stored on the second half of Track A. Dotted line 244 illustrates the half-way point of Tracks A & B.

As a result, the entire codeword for Message A or Message B can be read in half a rotation of the disc 202 so long as sliders 216, 217 as positioned to simultaneously read from Tracks A & B. Further, if one of the sliders 216, 217 has a technical problem and data from either of Tracks A & B is no longer readable, the other of the sliders 216, 217 can be used to recover a portion of the data that was distributed across Tracks A & B using the readable ECC (ECC A 236 or ECC B 242).

While dotted line 244 illustrates half of Tracks A & B in the implementation of FIG. 2, in other implementations, the dotted line 244 may positioned elsewhere within the Tracks A & B so that the first and second parts Messages A & B are disproportionate in size. Further, the Messages A & B may be distributed across more than the depicted two tracks (Tracks A & B), which further enhances the ability to recover data if one of the sliders 216, 217 has a technical problem rendering data on a track readable by the slider no longer readable. For example, to achieve 8:1 (8/9 code rate) parity, the codeword for Message A may be split across eight heads with a ninth head containing the parity bits (or ECC). Should the length of the ECC equal or exceed that of the combined Message A, the ECC may be used to recover data accessible by any of Heads 0-8 should a single head failure occur.

In various implementations, the amount of parity needed to recover from a head loss is the maximum length of any message track. An intermediate amount of parity is defined as that where the redundancy is enough to cover the loss of a transducer/track plus a margin for error (so that some redundancy left after the transducer/track loss). Further, depending on what parts of the Messages A & B are needed, a recovery operation may start by reading the parts of the message that are missing, and only bringing both of sliders 216, 217 to bear on Messages A & B (and redundancy) if needed to recover data.

Further, by distributing the data across more than the depicted two tracks (Tracks A & B), the entire codeword for Message A or Message B can be read in less than half a rotation of the disc 202 so long as corresponding sliders are positioned to simultaneously read from the tracks. More specifically, the entire track-sized codeword may be read in 1/n revolutions (where n is the number of codeword parts per track), assuming the same number of data paths are simultaneously activatable (e.g., 0.25 tracks in the case of the codeword distributed across 4 tracks, 0.125 in the case of the codeword distributed across 8 tracks, as so on). In other implementations, the Messages A & B are not designed to be read simultaneously (an asynchronous read). In such implementations, the error correction scheme 130 will work as described above except that the time to read the entire message is greater than it otherwise would be, due to actuator seek and disc rotational overhead between accessing two different parts of the message.

The distributed ECCs disclosed herein may utilize either block or convolutional codes, as well as any specific parity schemes thereof. Further, while storage devices such as the HDD assembly 200 typically use systematic codes where the original message is embedded in the codeword (e.g., a codeword of size n, composed of k blocks of message followed by k-n blocks of parity), the distributed ECCs disclosed herein are applicable to non-systematic codes.

Appearances of the actuator arms 214, 215 and other features of the HDD 200 are for illustration purposes only and the features are not drawn to scale. The various microelectronic components attached to each of the sliders 216, 217 may be referred to in total as a transducer head. The presently disclosed technology may apply to rotating disc storage drive technologies other than the magnetic domain HDD 200 depicted in FIG. 1 (e.g., optical disc drives), as well as non-rotating storage technologies (e.g., solid-state drives (SSDs)). Additional details regarding the error correction scheme 230 and other features of the HDD 200 may be found elsewhere herein.

In some implementations, the track(s) chosen to store the portions of codewords containing ECCs corresponds to one or more transducer head deemed most reliable, above a reliability threshold, having greater write durability, or having greater reliability than other transducer heads within the HDD. Greater write durability is the ability of the transducer and media to remain reliable through relatively more overwrites than other physical storage domains and their transducers. Greater reliability is generally the ability of the head to consistently read and write data to a data storage surface over time with a minimum of read or write errors and may be a measurable metric defined at the time of commissioning the HDD. In other implementations, the track(s) chosen to store the portions of codewords containing ECCs corresponds to data storage surfaces deemed having the greatest write durability, above a durability threshold, or having greater durability than other data storage surfaces within the HDD. Greater durability is generally the ability of the data storage surface to consistently retain written data over time and allow such data to be read with a minimum of read or write errors and may also be a measurable metric defined at the time of commissioning the HDD.

A number of factors may influence transducer head reliability and data storage surface durability, some of which are intentional design choices and others are inadvertent results of variances in manufacturing processes. For example, a lower density data storage surface (i.e., more loosely packed tracks) is generally more durable than a higher density data storage surface. The ECCs may be pushed to lower density data surfaces. For further example, heat-assisted magnetic recording (HAMR) generally has a shorter lifespan for associated transducer heads than non-assisted magnetic recording (NAMR). Thus, the ECCs may be pushed to NAMR heads. For still further example, some recording schemes are generally more durable than others (e.g., shingled is generally less durable than non-shingled data). Thus, the ECCs may be pushed to non-shingled data storage surfaces over shingled data storage surfaces.

In some implementations, write durability is impacted by the number of rewrite cycles supported by an HDD. The side effect of writing (e.g., scans, adjacent repairs, problems reading) is a component of write durability, but so are limitations on the write lifespan of associated transducer(s) and/or or storage media. Durable ECC updates to part of the codeword message can leave other parts untouched, but the ECC may be updated for nearly any update to any part of the message.

Further, the decision to bias the ECC to more reliable transducer heads or more durable data storage media could be implemented at the time the HDD is commissioned based on testing reliability of the transducer heads and/or durability of the data storage media. For further example, some HDDs may have additional disc capacity not necessary to reach their data storage specification that could be more loosely packed than the remainder of the disc to accommodate the ECCs at a relatively lower data storage density. In other implementations, the ECCs are intentionally spread out between multiple transducer heads to distribute the risk of loss of data between multiple transducer heads.

Further, while the example distributed error correction schemes disclosed herein are focused on distributing data among four or less transducer heads for ease of explanation, similar distributed error correction schemes may be scaled to more transducer heads. Further, to protect against a transducer head failure, the code rate may be chosen to be capable of achieving a full decode even with a loss of a transducer head (e.g., for a codeword distributed across 8 transducer heads, the 7/8 code rate may be used). In other words, the code rate is k/n. So, 7/8 code rate has 1 redundant sector for every 7 message sectors.

Figure 3:
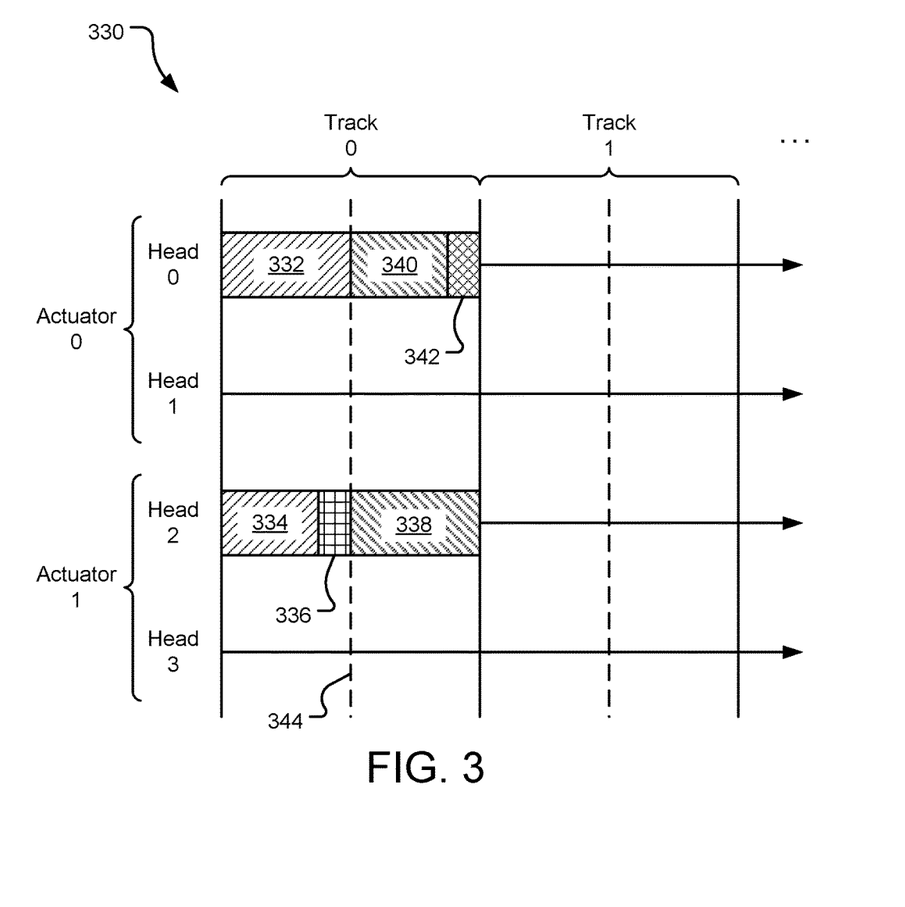
FIG. 3 illustrates an example distributed error correction scheme implemented on a 2-disc, 4-head hard disc drive assembly.

FIG. 3 illustrates an example distributed error correction scheme 330 implemented on a 2-disc, 4-head HDD. The HDD includes an array of tracks (e.g., Track 0, Track 1, and so on) arranged in concentric circles on two or more storage media surfaces of one or more storage platters making up the HDD. The storage media surfaces are each accessible by at least one transducer head (e.g., Heads 0-4), each of which is located at a distal end of an actuator arm. The actuator arms are each pivoted about an actuator spindle using an actuator spindle motor to access specific tracks on storage media surfaces within the HDD. In various implementations, the actuator arms also include micro-actuators to further fine tune motion of the actuator arms to access the specific tracks within the HDD. One or both of the actuator spindle motor and the micro-actuators are the actuators (e.g., Actuators 0 & 1) of FIG. 3. In other implementations, a single actuator arm may include multiple heads able to operate concurrently.

In the specific example of FIG. 3, Actuator 0 commonly actuates Head 0 and Head 1, each of which may access the same track on different storage media surfaces of the same or different storage platters. Similarly, Actuator 1 commonly actuates Heads 2 & 3, each of which may access the same track on different storage media surfaces of the same or different storage platters. In various implementations, Heads 0 & 1 may be capable of synchronous operation (operating simultaneously), but alternatively may be limited to asynchronous operation (not operating simultaneously. Similarly, Heads 2 & 3 may be capable of synchronous operation (operating simultaneously), but alternatively may be limited to asynchronous operation (not operating simultaneously.

The error correction scheme 330 is distributed across Track 0 on two different storage media surfaces (a total of two tracks). In various implementations, Track 0 may refer to the same radial position of multiple tracks existing on different storage media surfaces, each of which is accessible by at least one of Heads 0-3 in FIG. 3. Two codewords (Codewords A & B), each including a message (Messages A & B) and a corresponding ECC (ECCs A & B) are encoded on multiple storage media surfaces, here a first storage media surface accessible by Head 0 and a second storage media surface accessible by Head 2.

More specifically, a first part of Message A 332 is stored on the first half of Track 0 accessible by Head 0. A second part of Message A 334, as well as an ECC 336 for Message A, is stored on the first half of Track 0 accessible by Head 2. Similarly, a first part of Message B 338 is stored on the second half of Track 0 accessible by Head 2. A second part of message B 340, as well as an ECC 342 for Message B, is stored on the second half of Track 0 accessible by Head 0. Dotted line 344 illustrates the half-way point of Track 0 on each storage media surface.

As a result, the entire Codeword A or Codeword B can be read in half a rotation of a storage platter so long as Heads 0 & 2 are positioned to simultaneously read from Track 0 on their respective storage media surfaces. Further, if one of the Heads 0 & 2 has a technical problem and data from the associated storage media surface is no longer readable, the other of the Heads 0 & 2 can be used to recover a portion of the data that was distributed across the storage media surfaces using the readable ECC (ECC A 336 or ECC B 342).

While dotted line 344 illustrates the half-way point of Track 0 on each storage media surface in the implementation of FIG. 3, in other implementations, the dotted line 344 may positioned elsewhere within Track 0 so that the first and second parts of Messages A & B are disproportionate in size. Further, the Messages A & B may be distributed across more than the depicted two heads (Heads 0 & 2), which further enhances the ability to recover data if one of the heads has a technical problem rendering data on a track readable only by that head no longer readable. Further, by distributing the data across more than the depicted two heads, the entire Codeword A or Codeword B can be read in less than half a rotation of the storage platter so long as corresponding heads are positioned to simultaneously read from the tracks. More specifically, a track-sized codeword may be read in 1/n revolutions (where n is the number of codeword parts per track), assuming the same number of data paths are simultaneously activatable (e.g., 0.25 tracks in the case of the codeword distributed across 4 tracks, 0.125 in the case of the codeword distributed across 8 tracks, as so on).

Other HDDs may have more than 4 heads and/or more than 2 actuators. In those implementations, a similar error correction scheme to that of error correction scheme 330 may be applied to spread codewords across more storage media surfaces (e.g., by spreading a singular codeword across more than 4 storage media surfaces or spreading multiple codewords across multiple storage media surfaces on the same track (e.g., Track 0). Further, while only Tracks 0 & 1 are depicted in FIG. 3, each of the storage media surfaces may have vastly more tracks and a similar error correction scheme to that applied to Track 0 may be applied to Track 1 and/or any or all subsequent tracks.

Figure 4:
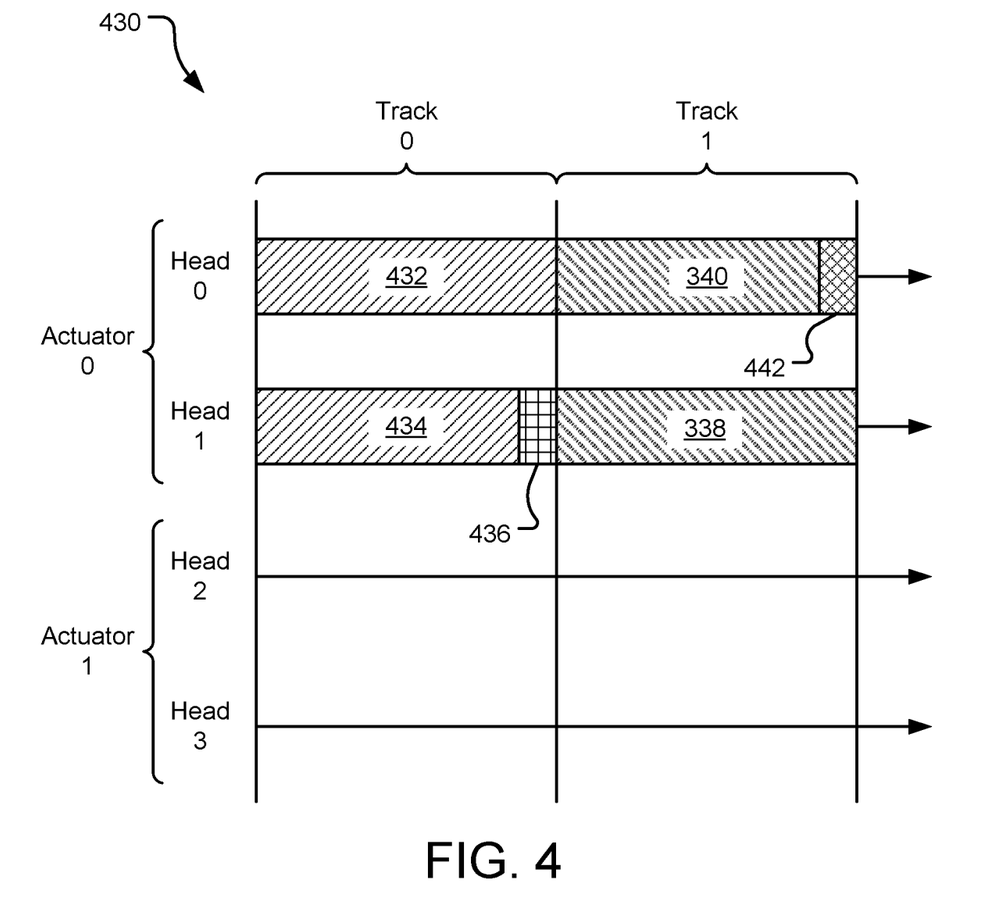
FIG. 4 illustrates another example distributed error correction scheme implemented on a 2-disc, 4-head hard disc drive assembly.

FIG. 4 illustrates another example distributed error correction scheme 430 implemented on a 2-disc, 4-head HDD. In various implementations, the 2-disc, 4-head HDD of FIG. 4 may be similarly arranged to the 2-disc, 4-head HDD of FIG. 3, as described in detail above. Other HDDs may have more than 4 heads and/or more than 2 actuators, as described above, but still implement a distributed error correction scheme similar to that of error correction scheme 430.

The error correction scheme 430 is distributed across Tracks 0 & 1 on two different storage media surfaces (a total of four tracks). In various implementations, Track 0 may refer to the same radial position of multiple tracks existing on different storage media surfaces, each of which is accessible by at least one of Heads 0-3 in FIG. 4. Track 1 may refer to a radial position adjacent to Track 0, but also the same radial position of multiple tracks existing on different storage media surfaces, each of which is accessible by at least one of Heads 0-3 in FIG. 4. Two codewords (Codewords A & B), each including a message (Messages A & B) and a corresponding ECC (ECCs A & B) are encoded on multiple storage media surfaces, here a first storage media surface accessible by Head 0 and a second storage media surface accessible by Head 1.

More specifically, a first part of Message A 432 occupies an entirety of Track 0 accessible by Head 0. A second part of Message A 434, as well as an ECC 436 for Message A, occupies an entirety of Track 0 accessible by Head 1. Similarly, a first part of Message B 438 occupies an entirety of Track 1 accessible by Head 1. A second part of message B 440, as well as an ECC 442 for Message B, occupies an entirety of Track 1 accessible by Head 0. Dotted lines 444, 445 illustrate half-way points of Tracks 0 & 1, respectively, on each storage media surface.

As a result, the entire Codeword A or Codeword B can be read in one rotation of a storage platter as Heads 0 & 1 are positioned to simultaneously read from Track 0 on their respective storage media surfaces based on the common Actuator 0. Further, if one of the Heads 0 & 1 has a technical problem and data from the associated storage media surface is no longer readable, the other of the Heads 0 & 1 can be used to recover a portion of the data that was distributed across the storage media surfaces using the readable ECC (ECC A 436 or ECC B 442). The Messages A & B may be distributed across more than the depicted two heads (Heads 0 & 1), which further enhances the ability to recover data if one of the heads has a technical problem rendering data on a track readable only by that head no longer readable.

As the Codewords A & B are distributed across tracks accessible by a singular actuator (Actuator 0), assuming Actuator 0 can only operate one head at a time, the data is only asynchronously accessible in the implementation of FIG. 4. Relatively large ECCs may be distributed across more failure domains than available synchronous data paths within the HDD. Further, as the Codewords A & B are larger than those of FIG. 3 to illustrate that the error correction schemes 330, 430 are scalable.

Figure 5:
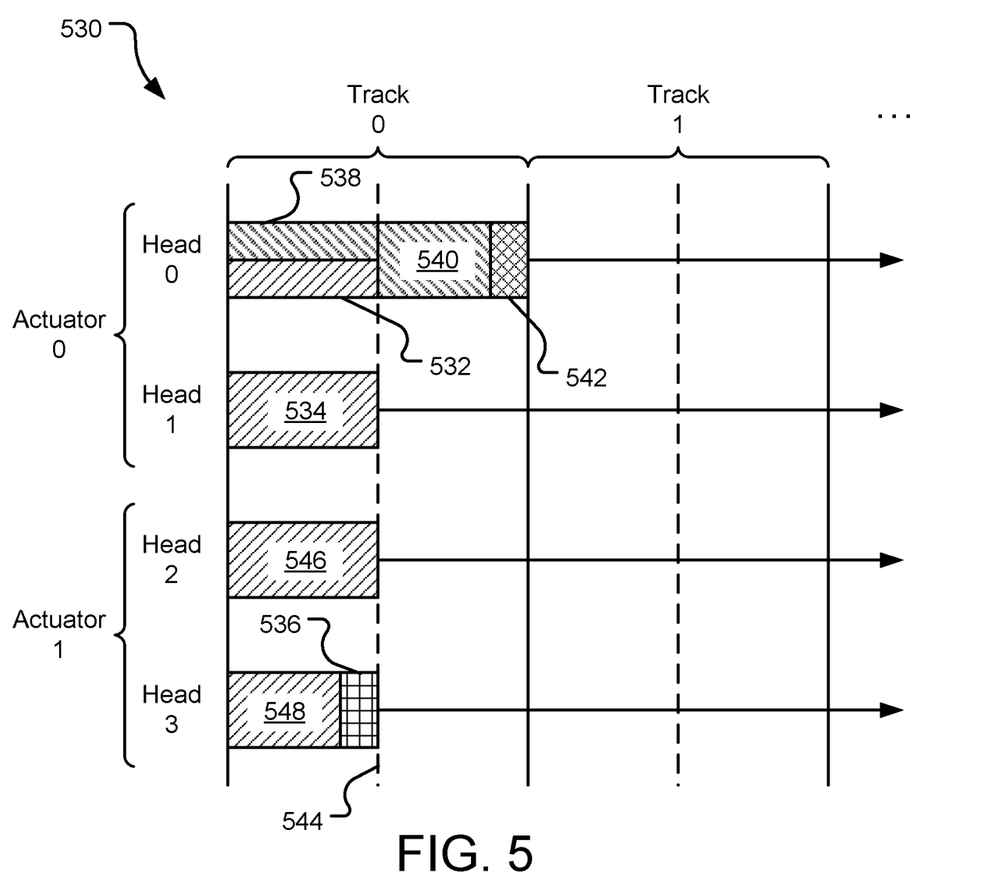
FIG. 5 illustrates yet another example distributed error correction scheme implemented on a 2-disc, 4-head hard disc drive assembly.

FIG. 5 illustrates yet another example distributed error correction scheme 530 implemented on a 2-disc, 4-head HDD. In various implementations, the 2-disc, 4-head HDD of FIG. 5 may be similarly arranged to the 2-disc, 4-head HDD of FIGS. 3 & 4, as described in detail above. Other HDDs may have more than 4 heads and/or more than 2 actuators, as described above, but still implement a distributed error correction scheme similar to that of error correction scheme 530.

The error correction scheme 530 is distributed across Track 0 on four different storage media surfaces (a total of four tracks). In various implementations, Track 0 may refer to the same radial position of multiple tracks existing on different storage media surfaces, each of which is accessible by at least one of Heads 0-3 in FIG. 5. Two codewords (Codewords A & B), each including a message (Messages A & B) and a corresponding ECC (ECCs A & B) are encoded on multiple storage media surfaces, here a first storage media surface accessible by Head 0, a second storage media surface accessible by Head 1, a third storage media surface accessible by Head 2, a fourth storage media surface accessible by Head 3.

More specifically, a first part of Message A 532 occupies a first half of Track 0 accessible by Head 0. Similarly, a second part of Message A 534 occupies a first half of Track 0 accessible by Head 1; a third part of Message A 546 occupies a first half of Track 0 accessible by Head 2; and a fourth part of Message A 548, as well as an ECC 536 for Message A, occupies an entirety of Track 0 accessible by Head 3.

A first part of Message B 538 also occupies a first half of Track 0 accessible by Head 0, overlapping the first part of Message A 532. The first part of Message A 532, and the first part of Message B 538 are composed of the same data blocks. Each of the data blocks participates in both ECC Messages A and B. Note that in various implementations, no more than one of these overlapped messages can be a convolutional code.

A second part of message B 540, as well as an ECC 542 for Message B, occupies a second half of Track 0 accessible by Head 0. Dotted line 544 illustrates a half-way point of Track 0 on each storage media surface. As a result, the ECC 542 accessible using Head 0 may be used for relatively small errors in Codeword B, while the ECC 536 may be used by Head 3 to fully reconstruct all or a portion of data lost as a result of a failure of any of Heads 0-2.

While dotted line 544 illustrates the half-way points of Track 0 on each storage media surface in the implementation of FIG. 5, in other implementations, the dotted line 544 may positioned elsewhere within Track 0. As a result, the first and second parts of Message B may be disproportionate in size. Further, the Messages A & B may be distributed across more than the depicted four heads (Heads 0-3), which further enhances the ability to recover data if one of the heads has a technical problem rendering data on a track readable only by that head no longer readable. Further, by distributing the data across more than the depicted four heads, the entire Codeword A can be read in less than half a rotation of the storage platter and the entire Codeword B can be read in less than one rotation of the storage platter. More specifically, a track-sized codeword may be read in 1/n revolutions (where n is the number of codeword parts per track), assuming the same number of data paths are simultaneously activatable. A codeword of any size may be read in the time it takes to perform one revolution divided by the number of codewords per track (e.g. in a system with 6 codewords distributed across 8 simultaneously-accessible tracks, each codeword can be read in $\frac{1}{8}^{th}$ the time of reading the codeword serially, which is equivalent to $\frac{1}{6}^{th}$ of one revolution).

Figure 6:
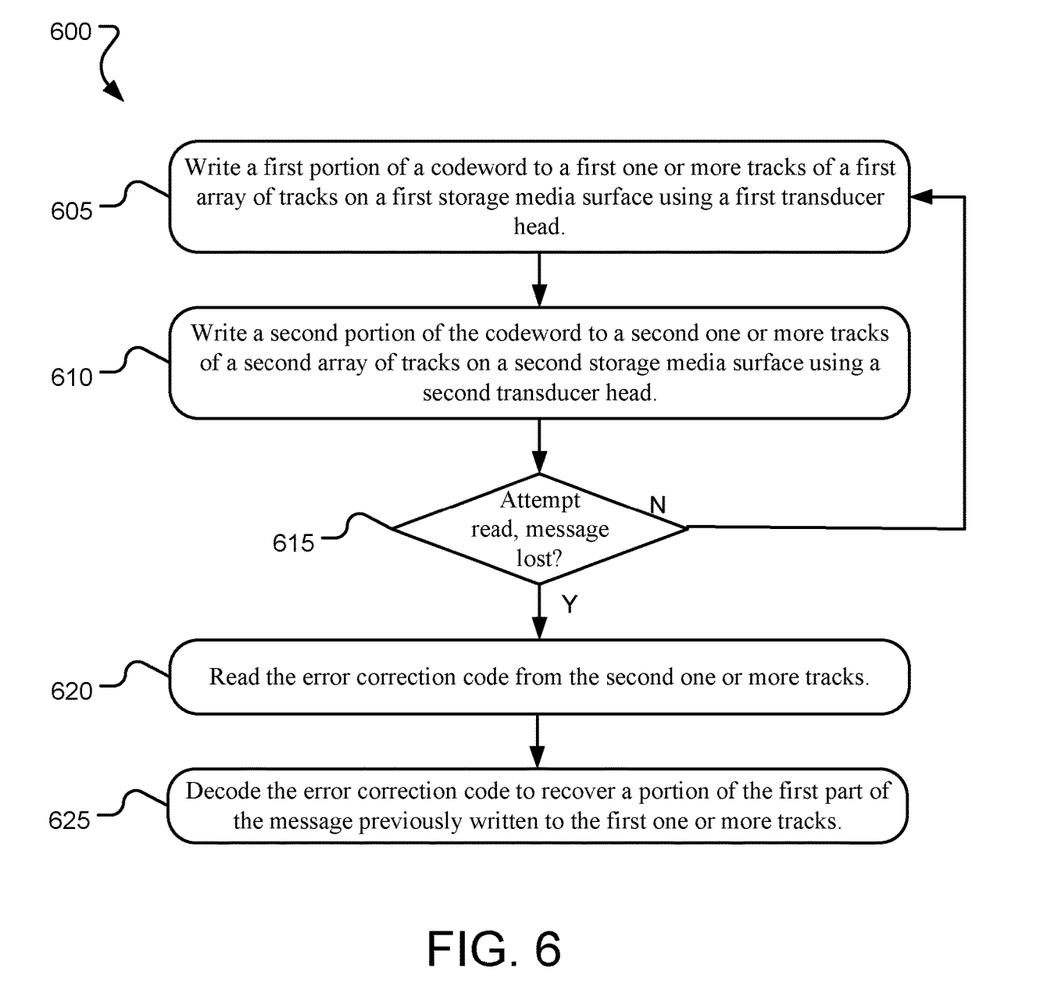
FIG. 6 illustrates example operations for writing and recovering data with a distributed error correction scheme.

FIG. 6 illustrates example operations 600 for writing and recovering data with a distributed error correction scheme. A first writing operation 605 writes a first portion of a codeword to a first one or more tracks of a first array of tracks on a first storage media surface of an HDD using a first transducer head. A second writing operation 610 writes a second portion of the codeword to a second one or more tracks of a second array of tracks on a second storage media surface of an HDD using a second transducer head. A first part of a message within the codeword occupies the first one or more tracks and a second part of the message and an error correction code within the codeword occupies the second array of tracks.

At a later time, when a read is attempted, decision operation 615 determines if some or all of the message has been lost due to data corruption or a problem with one of the first transducer head and the second transducer head. If data has not been lost, the first and the second writing operations 605, 610 may iteratively repeat to write additional codewords to the first storage media surface and the second storage media surface. If data has been lost, a reading operation 620 reads the error correction code from the second one or more tracks. A decoding operation 625 decodes the error correction code to recover a portion of the first part of the message previously written to the first one or more tracks. For tracks that are not entirely ECC, the ECC can help recover message on those tracks as well (not just the first track(s)).

While operations 600 explicitly reference an HDD, similar methods may be used to write and recover codewords to and from other storage devices using other data storage technologies. For example, in the instance of an SSD, a first storage media within the SSD may store a first part of a codeword. A second storage media within the SSD may store a second part of the codeword. The first storage media and the second storage media are logically, and perhaps physically distinct within the SSD (e.g., by storage density, write durability, logical separation, physical separation, etc.). The codeword includes a first part of a message, a second part of the message, and an error correction code. The error correction code portion of the codeword stored in a selected one of the first storage media and the second storage media. For example, the error correction code portion of the codeword may be stored in the storage media having a greater write durability than the other storage media.

Further, while operations 600 explicitly reference only two storage media surfaces and only two transducer heads, in practice, additional storage media surfaces and heads are used to achieve a desired redundancy in the data (e.g., 8:1 parity). The operations 600 may iteratively repeat to write and recover additional codewords from the HDD.

Figure 7:
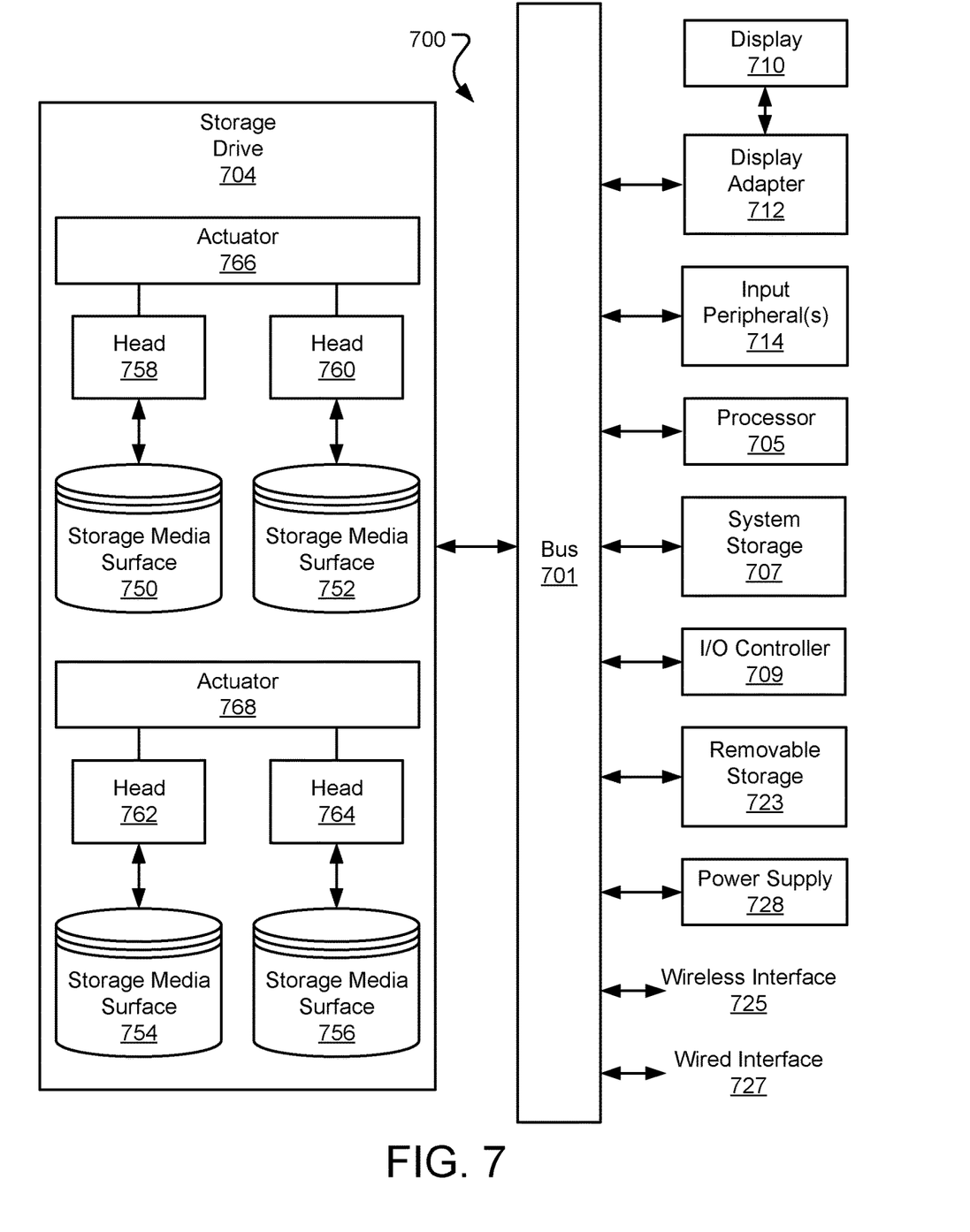
FIG. 7 illustrates an example system diagram of a computer system suitable for implementing a distributed error correction scheme on a data storage drive.

FIG. 7 illustrates an example system diagram of a computer system 700 (e.g., a network server) suitable for implementing a distributed error correction scheme on a data storage drive 704. The storage drive 704 includes a series of storage media surfaces (e.g., storage media surfaces 750, 752, 754, 756), each of which is accessible via a transducer head (e.g., heads 758, 760, 762, 764). In an HDD implementation, each of the storage media surfaces are on one side of a storage platter (each storage platter may include one or two storage media surfaces) and the transducer heads are attached to a slider that flies in close proximity above an assigned storage media surface as the storage platter spins. Actuators (e.g., actuators 766, 768), which may include one or both of a voice coil motor for one or more corresponding actuator arms and micro-actuators on each of the actuator arms, drive seek operations between tracks on the storage media surfaces. In the illustrated implementation of FIG. 7, actuator 766 drives seek operations for heads 758, 760 to read/write data to/from storage media surfaces 750, 752, respectively. Similarly, actuator 768 drives seek operations for heads 762, 764 to read/write data to/from storage media surfaces 754, 756, respectively.

The computer system 700 manages access to the storage drive 704, which includes reading/writing data using one or more of the distributed error correction schemes disclosed herein. The computer system 700 includes a bus 701, which interconnects major subsystems such as a processor 705, system storage 707 (such as random-access memory (RAM) and read-only memory (ROM)), an input/output (I/O) controller 709, removable storage (such as a memory card) 723, a power supply 728, and external devices such as a display screen 710 via a display adapter 712, and various input peripherals 714 (e.g., a mouse, trackpad, keyboard, touchscreen, joystick, and/or smart card acceptance device). Wireless interface 725 together with a wired network interface 727, may be used to interface to the data storage network and/or a local or wide area network (such as the Internet) using any network interface system known to those skilled in the art.

Many other devices or subsystems (not shown) may be connected in a similar manner (e.g., servers, personal computers, tablet computers, smart phones, mobile devices, etc.). Also, it is not necessary for all of the components depicted in FIG. 7 to be present to practice the presently disclosed technology. Furthermore, devices and components thereof may be interconnected in different ways from that shown in FIG. 7. Code (e.g., computer software, including mobile applications (apps) to implement the presently disclosed technology may be operably disposed in the system storage 707, removable storage 723, and/or the storage drive 704. For example, code for implementing the distributed error correction schemes described in detail above may be stored in the drive firmware/hardware 726, as shown.

The computing system 700 may include a variety of tangible computer-readable storage media (e.g., the system storage 707, the removable storage 723, and the storage drive 704) and intangible computer-readable communication signals. Tangible computer-readable storage can be embodied by any available media that can be accessed by the computing system 700 and includes both volatile and non-volatile storage media, as well as removable and non-removable storage media implemented in any method or technology for storage of information such as computer readable instructions, data structures, program modules, and/or other data. Tangible computer-readable storage media includes, but is not limited to, firmware, RAM, ROM, electrically erasable programmable read-only memory (EEPROM), flash memory or other memory technology, optical disc storage, magnetic cassettes, magnetic tape, magnetic disc storage or other magnetic storage devices, or any other tangible medium which can be used to store the desired information and which can be accessed by the computing system 700.

Intangible computer-readable communication signals may embody computer readable instructions, data structures, program modules, or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, radio frequency (RF), infrared (IR), and other wireless media. Computer-readable storage media as defined herein specifically excludes intangible computer-readable communications signals.

Some implementations may comprise an article of manufacture which may comprise a tangible storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (APIs), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described implementations. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain operation segment. The instructions may be implemented using any suitable high-level, low-level, object-oriented, visual, compiled and/or interpreted programming language.

The presently disclosed technology may be implemented as logical steps in one or more computer systems (e.g., as a sequence of processor-implemented steps executing in one or more computer systems and as interconnected machine or circuit modules within one or more computer systems). The implementation is a matter of choice, dependent on the performance requirements of the computer system implementing the presently disclosed technology. Accordingly, the logical operations making up implementations of the presently disclosed technology are referred to variously as operations, steps, objects, or modules. Furthermore, it should be understood that logical operations may be performed in any order, adding or replacing operations as desired, unless explicitly claimed otherwise or a specific order is inherently necessitated by the claim language.

The above specification, examples, and data provide a complete description of the structure and use of exemplary implementations of the presently disclosed technology. Since many implementations of the presently disclosed technology can be made without departing from the spirit and scope of the invention, the presently disclosed technology resides in the claims hereinafter appended. Furthermore, structural features of the different implementations may be combined in yet another implementation without departing from the recited claims.

What is claimed is:

1. A hard disc drive comprising:
a first storage media surface including a first array of tracks and an associated first transducer head; and
a second storage media surface including a second array of tracks and an associated second transducer head, wherein a first part of a message within a first codeword occupies one or more tracks of the first array of data tracks and a second part of the message and an error correction code within the first codeword occupies one or more tracks of the second array of data tracks.

2. The hard disc drive of claim 1, wherein the first part of the message within the first codeword occupies a first portion of one track of the first array of data tracks and the second part of the message and the error correction code within the first codeword occupies a first portion of one track of the second array of data tracks.

3. The hard disc drive of claim 1, wherein the first part of the message within the first codeword occupies an entire one track of the first array of data tracks and the second part of the message and the error correction code within the first codeword occupies an entire one track of the second array of data tracks.

4. The hard disc drive of claim 1, wherein the second codeword is also distributed across the same one or more tracks of the first array of data tracks and the same one or more tracks of the second array of data tracks.

5. The hard disc drive of claim 4, wherein the first part of the message within the second codeword occupies a second portion of the same one or more tracks of the second array of data tracks and the second part of the message and the error correction code within the second codeword occupies a second portion of the same one or more tracks of the first array of data tracks.

6. The hard disc drive of claim 1, wherein a second codeword is distributed across another one or more tracks of the first array of data tracks and another one or more tracks of the second array of data tracks.

7. The hard disc drive of claim 6, wherein a first part of a message within the second codeword occupies an entire one track of the second array of data tracks and a second part of the message and an error correction code within the second codeword occupies an entire one track of the first array of data tracks.

8. The hard disc drive of claim 1, wherein a second codeword is stored on the same one track of the first array of data tracks and overlaps with a portion of the first codeword, such that the overlapped portions are each contributing to both the first codeword and the second codeword.

9. The hard disc drive of claim 1, wherein the first transducer head is attached to a distal end of a first actuator arm and the second transducer head is attached to a distal end of a second actuator arm, the first actuator arm and the second actuator arm driven by a separate voice coil motors about a common axis of rotation.

10. The hard disc drive of claim 1, wherein the first transducer head is attached to a distal end of a first actuator arm and the second transducer head is attached to a distal end of a second actuator arm, the first actuator arm and the second actuator arm driven by separate voice coil motors about different axes of rotation.

11. The hard disc drive of claim 1, wherein the first codeword can be read from the hard disc drive in less than one revolution of the first media surface and the second media surface.

12. The hard disc drive of claim 1, wherein the first storage media surface is on a first storage platter and the second storage media surface is on a second storage platter.

13. The hard disc drive of claim 1, wherein the second transducer head has greater reliability than the first transducer head.

14. The hard disc drive of claim 1, wherein the second storage media surface or the second transducer head has greater write durability than the first storage media surface or the first transducer head.

15. The hard disc drive of claim 1, wherein the first transducer head and the second transducer head are configured to operate one of synchronously and asynchronously.

16. The hard disc drive of claim 1, wherein a loss of one of the first transducer head and the second transducer head does not result in a loss of data on the hard disc drive.

17. A method comprising:
writing a first portion of a codeword to a first one or more tracks of a first array of tracks on a first storage media surface using a first transducer head; and
writing a second portion of the codeword to a second one or more tracks of a second array of tracks on a second storage media surface using a second transducer head, wherein a first part of a message within the codeword is the first portion occupying the first one or more tracks and a second part of the message and an error correction code within the codeword is the second portion occupying the second array of tracks.

18. The method of claim 17, further comprising:
reading the error correction code from the second one or more tracks;
decoding the error correction code to recover a portion of the first part of the message previously written to the first one or more tracks.

19. A data storage device comprising:
a first storage media storing a first part of a codeword; and a second storage media logically disparate from the first storage media storing a second part of the codeword, wherein the codeword includes a first part of a message, a second part of the message, and an error correction code, the error correction code portion of the codeword stored in a selected one of the first storage media and the second storage media having a greater write durability than the other of the first storage media and the second storage media.

* * * * *